Feb. 21, 1967   J. M. CHRISTENSEN   3,304,569
WINDSHIELD WIPER CONSTRUCTION
Filed May 19, 1965
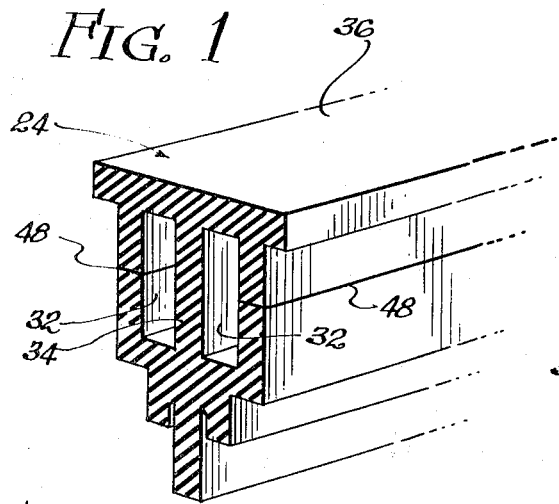
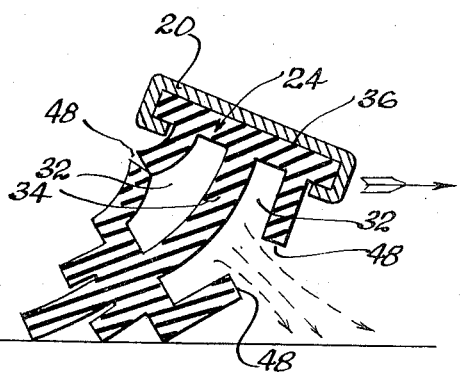
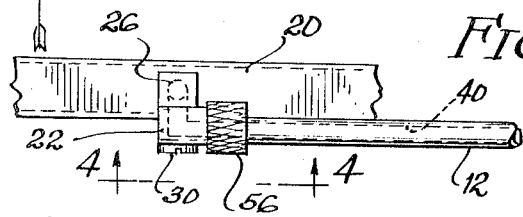
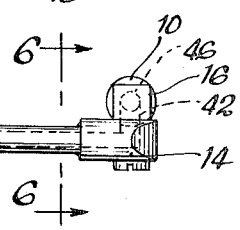
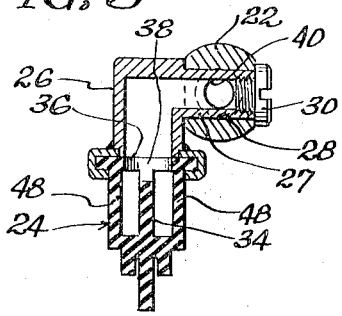
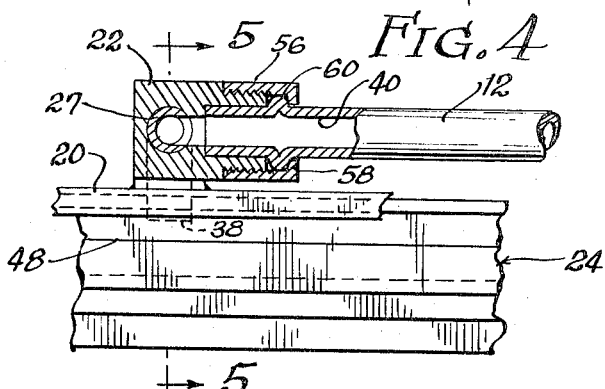
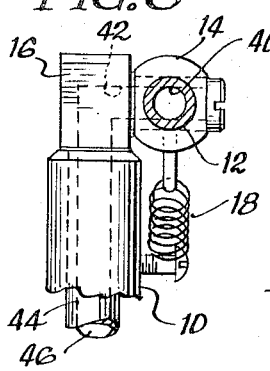
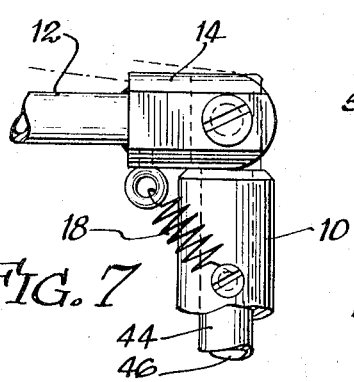
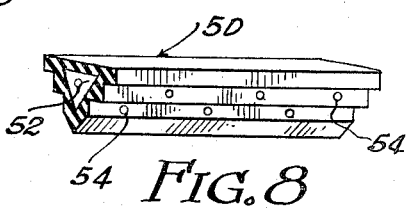
INVENTOR
Joseph M. Christensen
by McDougall, Hersh & Scott
Attys

United States Patent Office 3,304,569
Patented Feb. 21, 1967

3,304,569
WINDSHIELD WIPER CONSTRUCTION
Joseph M. Christensen, 359 W. Belden Ave.,
Chicago, Ill. 60614
Filed May 19, 1965, Ser. No. 456,972
4 Claims. (Cl. 15—250.04)

This invention relates to a novel windshield wiper construction. In particular, the invention is directed to a windshield wiper construction which includes air discharge means whereby windshields can be kept completely clear under adverse weather conditions.

Windshield wiper constructions which provide for the discharge of various liquids have previously been disclosed. Such constructions usually include means for mounting wiper blades with the mounting means being provided with channels or other constructions adapted to carry liquid and adapted to discharge liquid onto the windshield surface. In some instances, the liquid carrying channels have been incorporated in the moving portions of the construction. Thus, the channels and the discharge means were carried along with the moving wiper element so that the liquid discharge would take place on the windshield areas being traversed by the wiper element.

Prior art constructions of the type described have been characterized by certain difficulties. Relatively complicated mechanisms were required for holding liquid, for providing the necessary channels for passage of the liquid, and for providing means adapted to discharge the liquid onto the windshield surface. The mechanisms were also objectionable since they only operated when the necessary liquid supply was available and, accordingly, if the vehicle operator failed to replenish the liquid, the advantages of the system could not be realized. Finally, the prior art mechanisms were usually of a unique character from the structural standpoint whereby it was extremely expensive and difficult to install the mechanisms in conventional vehicles.

It is one object of this invention to provide a novel windshield wiper construction which is characterized by a unique operating technique whereby the construction is ideally suited for maintaining clean windshields even under evtremely adverse weather conditions.

It is a more particular object of this invention to provide a construction of the type described which includes means for passing hot air onto a windshield whereby the wipers will be effective to remove ice and snow in a highly efficient manner.

It is a further object of this invention to provide a windshield wiper of the type described which can be readily incorporated into conventional vehicle construction without undue expense.

These and other objects of this invention will appear hereinafter and for purposes of illustration, but not of limitation, specific embodiments of this invention are shown in the accompanying drawings in which:

FIGURE 1 is a fragmentary perspective view of a wiper blade adapted to be employed in the construction of this invention;

FIGURE 2 is a cross-sectional view of the wiper blade of FIGURE 1 as it appears in use;

FIGURE 3 is a fragmentary plan view of a windshield wiper assembly characterized by the features of this invention;

FIGURE 4 is an enlarged fragmentary view, partly cut away, taken about the line 4—4 of FIGURE 3;

FIGURE 5 is a cross-sectional view taken about the line 5—5 of FIGURE 4;

FIGURE 6 is an enlarged cross-sectional view taken about the line 6—6 of FIGURE 3;

FIGURE 7 is a side view of the elements shown in FIGURE 6; and

FIGURE 8 is a fragmentary perspective view of an alternative form of a wiper element.

The windshield wiper construction of this invention is conventional in certain respects. Specifically, the construction is characterized by a shaft which is operatively connected to a drive motor in the manner of conventional windshield wipers. A wiper supporting arm is connected to the shaft whereby the arm is adapted to be pivotally moved with respect to the axis of the shaft. A wiper blade channel element is attached to the arm so that the wiper blade carried by the channel element is adapted to sweep over the windshield surface in response to the movement of the shaft and wiper supporting arm.

The structure of this invention is also similar to certain prior art constructions in that passages are defined by the shaft and by the wiper supporting arm. Accordingly, the structure of this invention provides for the passage of fluid in the manner of some prior art constructions. Reference is made to Smulski Patent No. 2,348,502 for a typical example of such a wiper construction.

The particular improvement of this invention involves a structure which provides for the discharge of hot air onto the windshield surface as opposed to a liquid material. In addition, the instant invention provides a unique design for wiper blades which permits the hot air to be carried along the length of the wiper blade and to be discharged from the blade all along its length to provide a highly effective operation.

The accompanying drawings illustrate structural elements which embody the features of this invention. The elements include a wiper shaft 10 and a wiper arm 12. The end 14 of the arm 12 is connected to the head 16 of the shaft 10. A spring 18 is attached to the arm and to the shaft to normally urge the arm into engagement with the windshield surface. The use of the spring 18 or a similar arrangement permits a certain freedom of movement in the arm to accommodate variations in the window plane and to permit cleaning and removal of the wiper blades.

A wiper blade channel element 20 is attached to the end 22 of the arm 12. A wiper blade 24 is associated with the element 20. In the embodiment shown, the element 20 is attached to a hollow member 26 including an extension 27 which is adapted to be received in a circular bore 28 defined by the end 22 of the arm 12. A screw 30 serves to close off the end of the neck portion 27. It will be appreciated that the blade 24 can be replaced by sliding the blade out of the channel element 20 and inserting a new blade.

The blade 24 defines a pair of channels 32 divided by a central wall 34. The top surface 36 of the blade defines an opening 38 at the juncture of the blade with the member 26. The neck portion 27 communicates with a passage 40 defined by the arm 12. The passage 40, in turn, communicates with a passage 42 formed by the opening defined in the end 14 of the arm 12 and the opening defined in the head 16 of the shaft 10. The shaft 10 comprises a hollow shaft surrounding the tube 44 which defines a central bore 46. It will be appreciated when considering this arrangement that material such as hot air passing into the bore 46 will be passed along the arm 12 and into the interior of the blade 24.

The blade 24 comprises a standard design with the exception of the internal passages, and with the exception of openings which communicate these passages with the outside atmosphere. In the arrangement shown in FIGURES 1 and 2, these openings are formed by means of slits 48 which extend the length of the blade. When the blade is in use as shown in FIGURE 2, it will bend in one direction to thereby open the blade along one side for the passage of air onto the windshield surface. With an arrangement of this type, the air will be directed downwardly onto the surface while the slit 48 on the opposite side of the blade will not be opened whereby none of the air will be wasted. Obviously, when the blade completes its movement across the windshield and begins its return movement, the other side of the blade will be open to again provide for direct application of the hot air. The central wall 34 of the blade serves to hold the blade together.

FIGURE 8 illustrates one conceivable alternative form of the invention. In this instance, a wiper blade 50 defining a single internal passage 52 is employed. Openings 54 defined by the wiper blade serve to direct air outwardly onto the windshield surface. The action of this blade is quite similar to the action previously described in that the bending action which takes place during operation tends to close openings on the side of the blade which is facing away from the windshield surface. This provides for a more efficient distribution of the air.

The source of the hot air to be employed in the system of this invention may comprise the heater air of the vehicle. On the other hand, it is contemplated that exhaust fumes could be employed. In either case, the attachment of a line from the source of the air to the tubular member 44 can be readily accomplished. In this connection, it will be understood that the reference to the use of air in the specification and in the appended claims is intended to include materials such as the exhaust fumes.

As previously indicated, the instant invention is directed primarily to the nature of the wiper blade and to the use of air as opposed to a liquid. The particular structures illustrated with regard to the wiper arm and the drive means therefor are provided solely for purposes of illustration, and many conventional alternatives are available for use. In this connection, reference is made to the aforementioned Smulski disclosure.

With regard to the construction disclosed, the shaft 10 is adapted to rotate first in one direction and then in the opposite direction relative to the member 44. The arm and wiper blade move in response to this rotation with a limited amount of freedom provided for movement of the arm out of the plane shown in opposition to the action of spring 18.

The blade holding element 20 is connected to the arm 12 by means of an internally threaded screw member 56. The screw member defines a flange 58 which engages protrusions 60 formed in the wall of the arm 12.

The operation of the described construction provides for the distribution of hot air whereby any ice, snow or frost can be quickly removed from a windshield surface. Furthermore, the continued use of the construction will prevent any accumulation of such materials. The efficiency of the construction is much greater than conventional automobile defrosters since higher temperatures can be developed and since there is a direct application of the heated air rather than an indirect application of heat through the glass windshield.

The construction of this invention also comprises a substantial improvement over constructions which provide for the distribution of liquid over a windshield surface. Such constructions are of little or no value with respect to the removal of ice and snow. Furthermore, such constructions are only usable when liquid is available, and there is a great inconvenience insofar as replacement of the liquid is concerned. In the case of the instant invention, the source of heat provided by the engine is inexhaustible and the instant invention largely involves the use of heat which is otherwise wasted to thereby provide an extremely efficient operation.

It will be understood that various changes and modifications may be made in the above described construction which provide the characteristics of this invention without departing from the spirit thereof particularly as defined in the following claims.

That which is claimed is:

1. In a windshield wiper construction comprising a wiper shaft, a wiper supporting arm connected to said shaft, a wiper blade channel element attached to said arm, and a wiper blade carried by said channel element, said shaft and said arm defining passages for the movement of fluid therethrough, the improvement wherein said wiper blade comprises a base portion, a centrally located portion depending from said base portion, and substantially flat side walls depending from said base portion on opposite sides of said centrally located portion, a pair of interior passages defined by the respective side walls and said centrally located portion and extending along the length of said blade, a central hole in said base portion communicating said interior passages with said passages in said shaft and arm, means for connecting the passage in said shaft to a source of hot air, and openings defined by said wiper blade whereby said hot air can be passed onto the windshield surface, said openings comprising longitudinal slits formed in said side walls and dividing the side walls into separate sections whereby bending of the blade in one direction during contact with the windshield surface will open one side of the blade for passage of air out of one of said laterally spaced passages, while bending of the blade in the other direction will open the other side of said blade.

2. A construction in accordance with claim 1 wherein said passages are connected to the exhaust of the vehicle with which the windshield wiper is associated whereby exhaust fumes are distributed over said windshield surface.

3. A construction in accordance with claim 1 wherein said passages are connected to the heater for the vehicle with which the windshield wiper is associated to thereby provide for the distribution of hot air over said windshield surface.

4. A constructon in accordance with claim 1 wherein said slits extend substantially completely along the length of said blade, said centrally located portion providing the means for connecting the sections of said side walls remote from said base portion, and including a central strip formed as an extension of said centrally located portion.

References Cited by the Examiner

UNITED STATES PATENTS

| 1,745,246 | 1/1930 | Colley | 15—250 |
| 1,801,373 | 4/1931 | Stevens | 15—250 |
| 2,582,717 | 1/1952 | Pierce | 15—250 |

FOREIGN PATENTS

| 801,989 | 9/1958 | Great Britain. |

CHARLES A. WILLMUTH, *Primary Examiner.*